Nov. 6, 1923.
A. BARTLEMAY
BEARING
Filed Sept. 1, 1921
1,473,138
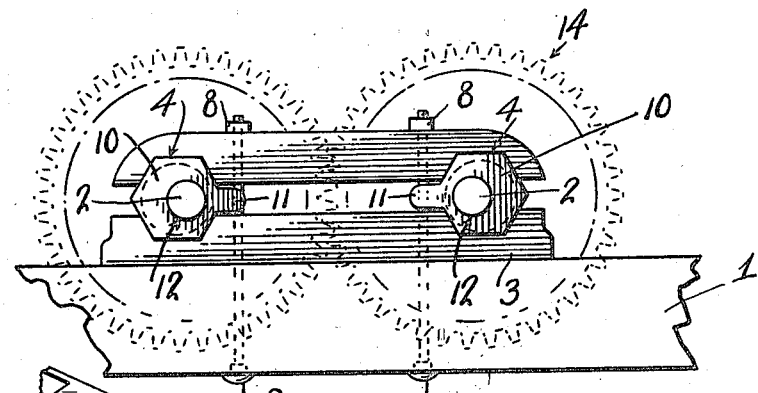
Fig. 1.
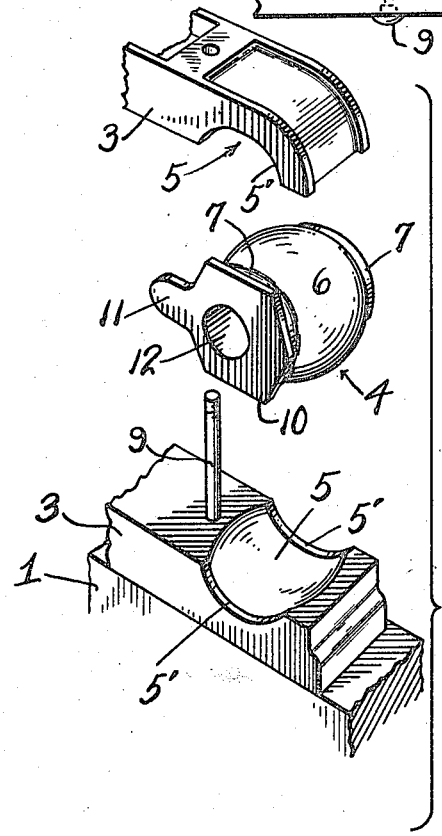
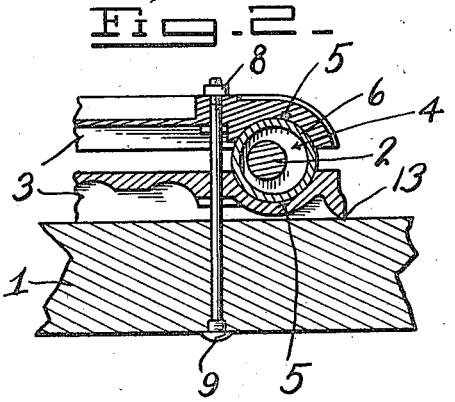
Fig. 2.
Fig. 3.
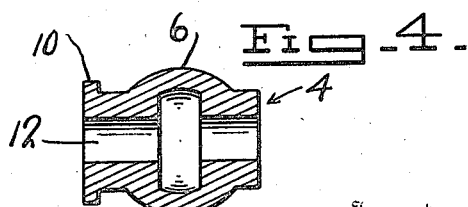
Fig. 4.
Inventor
Arlie Bartlemay
By L. B. James
Attorney Patented Nov. 6, 1923.

1,473,138

UNITED STATES PATENT OFFICE.

ARLIE BARTLEMAY, OF BLUFFTON, INDIANA, ASSIGNOR TO THE RED CROSS MANUFACTURING CO., OF BLUFFTON, INDIANA.

BEARING.

Application filed September 1, 1921. Serial No. 497,685.

*To all whom it may concern:*

Be it known that I, ARLIE BARTLEMAY, a citizen of the United States, residing at Bluffton, in the county of Wells and State of Indiana, have invented certain new and useful Improvements in Bearings, of which the following is a specification.

This invention relates to bearings for rotatable members, an object of the invention being to provide means whereby the rotatable members can be adjusted in relation to each other by making certain adjustments in the bearings.

Another object of the invention is to provide means whereby the parts are held in assembled position by pairs of holding blocks which are bolted together and to the supporting structure.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 in a fragmentary elevation showing the invention in use.

Figure 2 is a fragmentary sectional view.

Figure 3 is a fragmentary perspective view showing the parts separated.

Figure 4 is a detail sectional view.

The drawings show the invention as forming part of a cider mill, such as that forming the subject matter of an application filed by me on Oct. 16, 1919, Serial No. 331,227, and allowed July 22, 1921. It will of course be understood, however, that the invention is not to be limited to this use as it may be used in other situations.

In these views 1 indicates a portion of the supporting frame which, in this instance, would be one of the sills of the frame of the cider press. It is understood that the drawings show the parts at one side of the frame, there being a similar arrangement of parts at the other side to support the opposite ends of the shafts 2.

A pair of blocks 3 are supported on each of the sills, these blocks acting to support the bearings 4. Each block of each pair is provided with a substantially semi-spherical recess 5 in each end for receiving the substantially spherical part 6 of the bearing, cylindrical end parts 7 being provided on the bearings for engaging semi-circular end portions 5' of the recesses. The opposing recesses in the blocks form chambers for receiving the bearings so that the bearings can be rotated in the chambers by loosening the nuts 8 on bolts 9 which will hold the blocks to the frame and in engagement with the bearings. The outer end of each bearing is provided with a flat head 10 which is located beyond the outer faces of the blocks and one edge of each head is provided with a projection 11 which acts as an indicator for indicating the position of the eccentric opening 12 in the bearing. This opening receives the end of the shaft so that by rotating the bearing in its chamber the shaft is adjusted as will be seen. In this way the two shafts with the parts carried thereby can be adjusted towards and away from each other by simply rotating the bearings in the recesses in the blocks. After the adjustments have been made the nuts on the bolts are tightened to clamp the bearings in adjusted position. The part 11 also acts as a handle for facilitating the movement of the bearings.

The ends of the lower blocks are provided with knife edges 13 for biting into the sills 1 and thus helping to hold the blocks in position.

Figure 1 shows the shafts as provided with the intermeshing gears 14 and these shafts will carry the crushing rolls of the cider mill as described in the before mentioned application, when the invention is used on a cider mill.

It is though from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A bearing of the class described comprising spaced supporting members having substantially semi-spherical and semi-circular recesses therein, substantially semi-spherical bearing blocks seated in said semi-spherical recesses with their ends journaled in said semi-circular recesses, and means securing said bearing blocks between the spaced supporting members.

2. A bearing of the class described comprising substantially semi-spherical bearing blocks having protruding circular ends and eccentrically disposed openings extending lengthwise therethrough, spaced supporting members partially encircling the bearing blocks and bearing on the protruding ends thereof, and means securing the supporting members against the bearing blocks.

3. A bearing of the class described comprising substantially semi-spherical bearing blocks having protruding ends and eccentric openings in communication with enlarged pockets therein, and supporting elements for said bearing blocks.

In testimony whereof I affix my signature.

ARLIE BARTLEMAY.